US006632337B2

United States Patent
Platz et al.

(10) Patent No.: US 6,632,337 B2
(45) Date of Patent: Oct. 14, 2003

(54) ELECTRODE FOR THE ELECTROCHEMICALLY FINE-BORING WORKPIECES AND METHOD FOR PRODUCING THE SAME

(75) Inventors: Albin Platz, Ried-Baindlkirch (DE); Konrad Rager, Pfaffenhofen/Glonn (DE)

(73) Assignee: MTU Aero Engines GmbH, Munich (DE)

( * ) Notice: Subject to any disclaimer, the term of this patent is extended or adjusted under 35 U.S.C. 154(b) by 110 days.

(21) Appl. No.: 09/913,468

(22) PCT Filed: Dec. 13, 2000

(86) PCT No.: PCT/DE00/04420

§ 371 (c)(1),
(2), (4) Date: Oct. 25, 2001

(87) PCT Pub. No.: WO01/43909

PCT Pub. Date: Jun. 21, 2001

(65) Prior Publication Data

US 2002/0157944 A1 Oct. 31, 2002

(30) Foreign Application Priority Data

Dec. 16, 1999 (DE) .......................................... 199 60 790

(51) Int. Cl.⁷ .............................................. C25B 11/00

(52) U.S. Cl. ........................ 204/280; 204/293; 29/745; 29/746; 29/747; 29/825; 29/854; 29/857

(58) Field of Search .............................. 204/280, 293; 205/649, 651, 652, 653, 654, 665, 670, 672, 686; 29/745, 746, 747, 825, 854, 857

(56) References Cited

U.S. PATENT DOCUMENTS

| 3,352,770 | A | | 11/1967 | Crawford et al. |
| 3,485,744 | A | | 12/1969 | Schaffner |
| 3,676,310 | A | | 7/1972 | Wishnie |
| 4,806,721 | A | | 2/1989 | Ito et al. |
| 5,685,971 | A | * | 11/1997 | Schroder et al. ............ 205/665 |
| 6,387,242 | B1 | * | 5/2002 | Wei et al. ................... 205/665 |

* cited by examiner

Primary Examiner—Bruce F. Bell
(74) Attorney, Agent, or Firm—Kenyon & Kenyon

(57) ABSTRACT

An electrode for the electrochemical fine-boring of workpieces includes an electrode tube for an electrolyte to pass through to reach a workpiece which is to be machined, and an electrical conductor which is connected to the electrolyte, in which electrode the tube, for the purpose of boring bores with the smallest possible diameter, consists of a metal with a substantially amorphous structure, is electrically conductive and is provided on its outer surface, at least in sections, with a nonconductive insulating layer.

12 Claims, 3 Drawing Sheets

ELECTRODE FOR THE ELECTROCHEMICALLY FINE-BORING WORKPIECES AND METHOD FOR PRODUCING THE SAME

FIELD OF THE INVENTION

The present invention relates to an electrode for the electrochemical fine-boring of workpieces, including an electrode tube for an electrolyte to pass through to reach an electrically conductive workpiece which is to be machined, and an electrical conductor which is connected to the electrolyte, and to a process for producing an electrode for the electrochemical fine-boring of workpieces.

BACKGROUND INFORMATION

A conventional electrode for electrochemical boring includes a glass tube which is secured in a holding device, consists of $SiO_2$ glass and through which an electrolyte flows. The electrolyte is brought into contact, through an opening in the glass tube which is opposite the holding device, with the area of a workpiece which is to be machined by boring. In the glass tube, there is an electrical conductor, to which a negative electric charge is applied via a DC source. The opposite, positive charge is applied to the workpiece, so that a chemical reaction leads to material being eroded at the area of the workpiece which is to be machined. The electrical conductor generally consists of a metal, such as a platinum wire.

A drawback of this arrangement is that when using glass tubes, the electrochemical boring is only able to produce holes or bores with a minimum diameter of 0.2 mm. Moreover, the electrode, which includes a glass tube and wire arranged therein, is of relatively complicated and sensitive construction.

It is an object of the present invention to provide an electrode that may be used to produce holes or bores with a very small diameter in combination with a simple electrode construction. Moreover, it is another object of the present invention to provide a process for producing such an electrode.

SUMMARY

According to the present invention, the electrode tube is formed of a metal with a substantially amorphous structure, is electrically conductive and therefore simultaneously serves as an electrical conductor for applying a charge, and is provided on its outer surface, at least in sections, with a nonconductive insulating layer.

One advantage of an electrode made from a tube of this type is that metals of substantially amorphous structure, so-called metallic glass materials, may be processed to form tubes having relatively small external diameters in the range from 0.2 mm to 0.04 mm. Tubes produced from metal with a substantially amorphous structure are resistant to corrosion and wear and have a virtually smooth and flawless surface, along which the flow of electrolyte is optimal. Moreover, it is possible to eliminate the introduction of a metallic conductor, such as a platinum wire, since the negative charge of a DC source is applied to the tube itself. The positive charge of the DC source is applied to the workpiece which is to be machined.

The external diameter of the tube may be at most slightly less than 0.2 mm, and may be in the range from 0.2 mm to 0.04 mm, so that it is substantially possible to produce holes or bores with a diameter of 0.2 mm and below.

The tube may be of any desired cross-sectional geometry and may be adapted to various applications, so that it is also possible for holes which are not circular in cross section to be formed in the workpiece.

The tube may furthermore consist of a metallic solid glass, such as a ZrTiNiCuBe alloy, it also being possible to use other suitable alloys and therefore other metals which are of a substantially amorphous structure.

The nonconductive insulating layer may be a layer based on AlON or TiAlON or organic, such as coating, materials, or inorganic oxide ceramic, the layer thickness of this layer being very small. The thickness of the insulating layer may be less than 10 $\mu$m and is generally between 4 $\mu$m and 10 $\mu$m. With an insulating layer based on TiAlON, the layer may be applied to the tube made from a metal of substantially amorphous structure by sputtering or vapor deposition.

The entire outer surface of the tube may be provided with a nonconductive insulating layer, in order to prevent electrochemical corrosion or additional undesired erosion during fine-boring at the wall of the bore formed in the workpiece.

Those sections of the tube which are provided with the nonconductive insulating layer may be provided with an electrically conductive metal or graphite layer, to which, as a so-called protective current electrode, an opposite charge to that of the tube made from a metal of substantially amorphous structure may be applied.

According to the present invention, the process for producing an electrode for electrochemical fine-boring includes the steps of providing an electrically conductive metal with a substantially amorphous structure as material for the electrode tube, drawing the electrode tube from a semi-finished tube of larger external diameter to a smaller external diameter by glass drawing, and applying a nonconductive insulating layer at least to sections of its outer surface.

DETAILED DESCRIPTION

Figure 1:
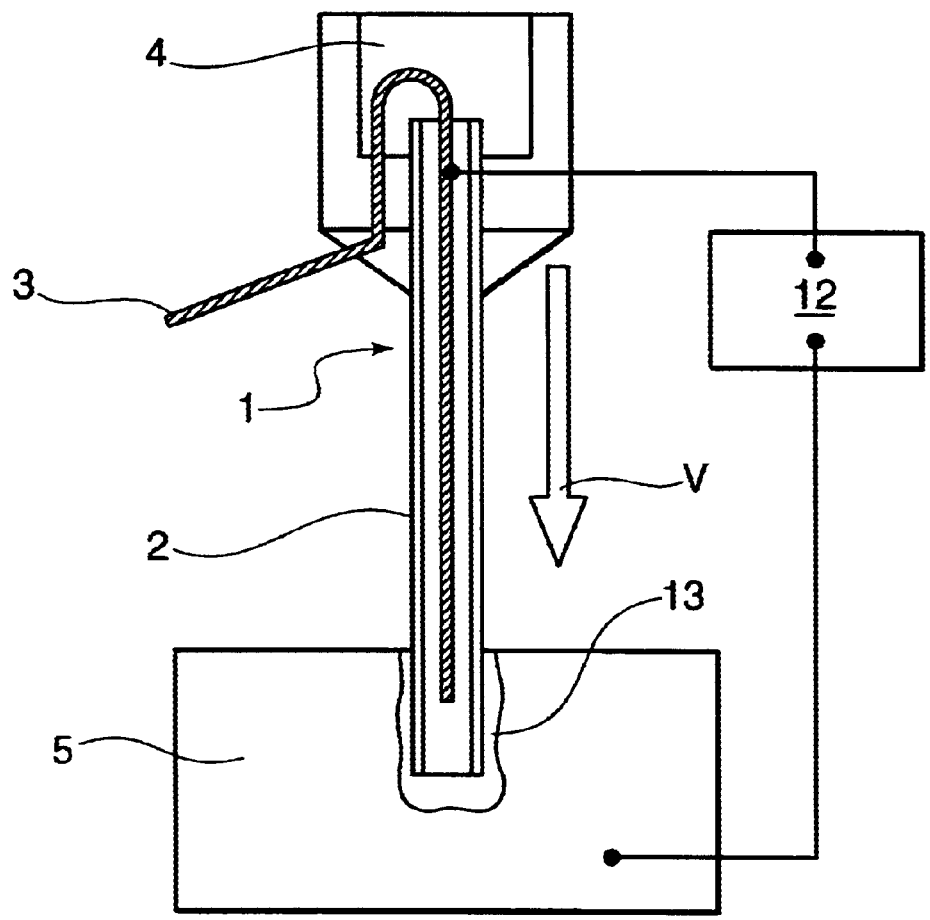
FIG. 1 illustrates an electrochemical boring arrangement with an electrode, according to the prior art.

FIG. 1 schematically illustrates an electrochemical boring arrangement which is known from the prior art, with an electrode 1 that includes a glass tube 2 and a platinum wire 3 which is arranged therein and serves as an electrical conductor. An electrolyte 4 flows through the glass tube 2 and, at the end side, emerges in a region of a workpiece 5 which is to be machined by electrochemical boring. A DC source 12 is used to apply opposite charges to the platinum wire 3 and the workpiece 5, so that the chemical reaction which is required for the electrochemical boring occurs with the exchange of electrons. A negative charge is applied to the platinum wire 3, and a positive charge is applied to the workpiece 5. During the boring, the electrode 1 is moved in the direction of arrow V.

When using a glass tube, the bores 13 which are to be produced in the workpiece 5 using the electrochemical boring process are limited to a minimum diameter of 0.2 mm. Moreover, the structure of the electrode 1 including the glass tube 2 and the platinum wire 3 arranged therein is complicated and sensitive.

Figure 2:
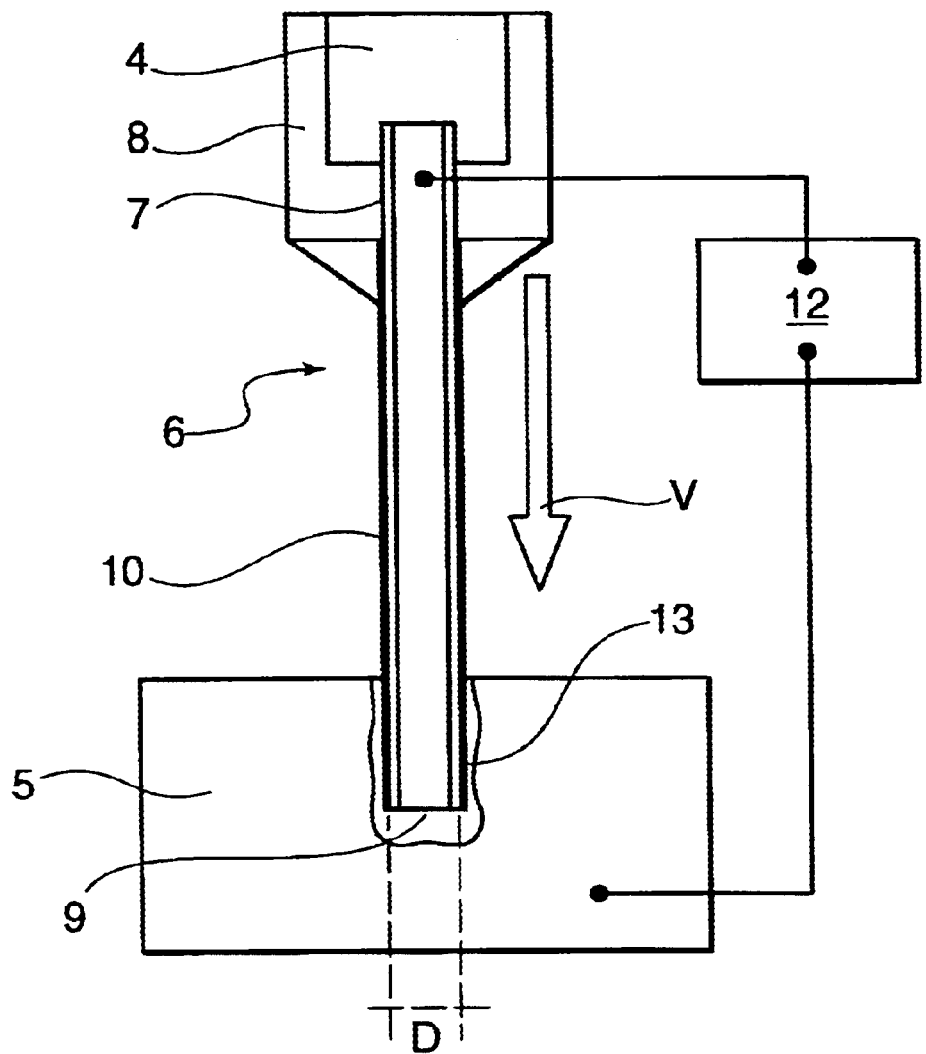
FIG. 2 illustrates a first example embodiment of an electrochemical fine-boring device having an electrode according to the present invention.

FIG. 2 schematically illustrates an electrochemical fine-boring arrangement according to one configuration of the electrode according to the present invention, which is denoted overall by 6 and includes an electrode tube 7 made from a metal of substantially amorphous structure, such as, for example, a ZrTiNiCuBe alloy. The tube 7 has an external diameter D which is less than 0.2 mm and, depending on the size of the desired bore 13 in the workpiece 5, is in the range between 0.2 mm and 0.04 mm. Opposite electric charges are applied to the electric tube 7 and the workpiece 5 by a DC source 12, a negative charge being applied to the tube 7 and a positive charge being applied to the workpiece 5.

An electrolyte 4 flows through the tube 7 from a holding device 8 to an opening 9 of the tube 7, where it comes into contact with that area of the workpiece 5 which is to be eroded by electrochemical boring, in order to erode the material of the workpiece 5 by a standard chemical reaction with exchange of electrons. The tube 7 is secured in a conventional manner in the holding device 8, through which the electrolyte 4 is fed to the tube 7.

In the present configuration, a nonconductive insulating layer 10 is applied to the entire outer surface of the tube 7, in order to prevent electrochemical corrosion or an additional, undesired erosion during fine-boring at the wall of the bore 13. The insulating layer 10 ensures that there is no current passing through at this point and therefore there is neither corrosion nor undesirable erosion of material. The chemical reaction occurs exclusively in the region of the opening 9 of the tube 7 and leads to erosion of material and to the bore 13 becoming deeper. The insulating layer 10 is a layer of a mixed oxide, for example based on TiAlON, which has been applied by sputtering or vapor deposition and has a layer thickness which is generally less than 10 $\mu$m and therefore only slightly increases the desired small external diameter of the tube 7.

Figure 3:
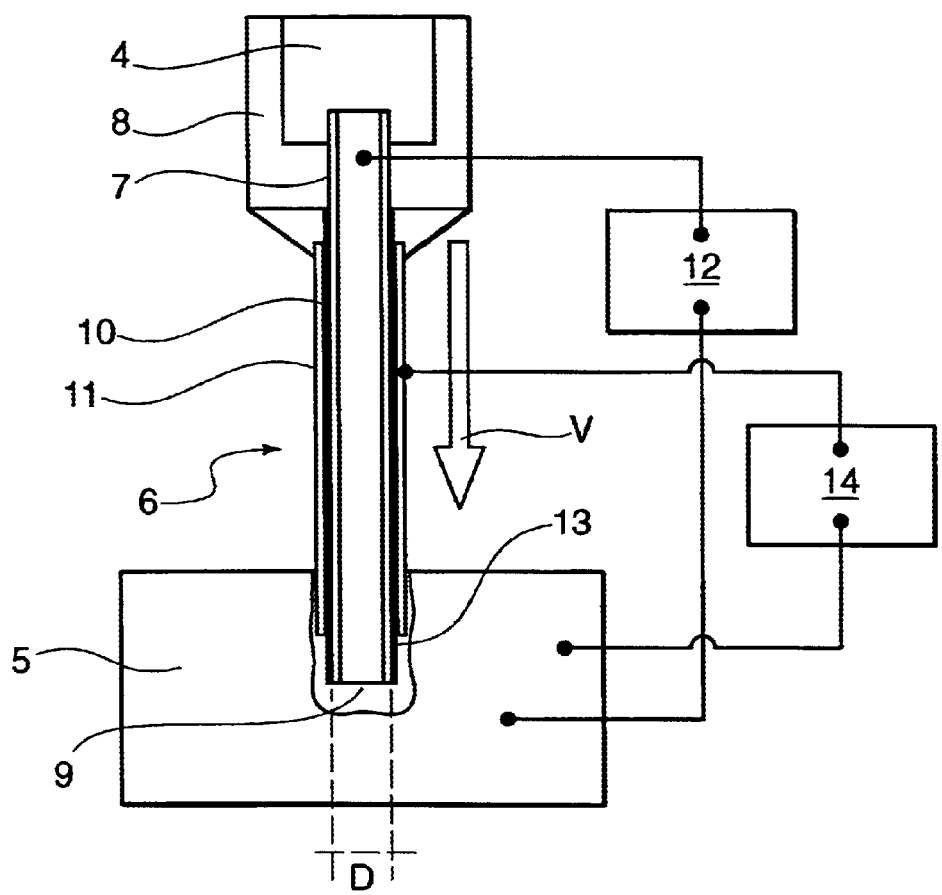
FIG. 3 illustrates a second example embodiment of an electrochemical fine-boring arrangement having an electrode according to the present invention.

FIG. 3 schematically illustrates an alternative configuration of the electrode according to the present invention, which is denoted overall by 6 and in which an electrode tube 7 consists of an electrically conductive metal which is of substantially amorphous structure. The tube 7 is held in a holding device 8, from which it is supplied with an electrolyte 4. The electrolyte 4 flows through the tube 7 and emerges, at an opening 9 of the tube 7, at that area of a workpiece 5 which is to be machined. A negative charge is applied to the electrically conductive tube 7 via a DC source 12, and a positive charge is applied to the workpiece 5 in which a bore 13 is to be made by electrochemical fine-boring via the DC source 12. A nonconductive insulating layer 10 based on an oxide ceramic, such as, for example, $Al_2O_3$, is applied to an outer surface of the tube 7, so that there is no current passing through this layer. The foregoing arrangement may, for example, prevent electrochemical corrosion or additional, undesired erosion of material in the region of the wall of the bore 13 in the workpiece 5.

The tube 7 has an external diameter D of 0.09 mm, so that a bore 13 of slightly larger than 0.09 mm is produced, taking into account the thickness of the insulating layer 10 of approximately 7 $\mu$m. Therefore, the material is eroded exclusively in the region of the opening 9 of the tube 7 as a result of a conventional chemical reaction with exchange of electrons, since the electrolyte is connected firstly to the electrically conductive tube 7 and secondly to the workpiece 5, which is likewise electrically conductive. During the boring operation, the electrode 6 is moved in the direction of arrow V, in order to achieve the desired depth of the bore 13. Due to the insulating layer 10, there is no undesirable erosion of material at the wall of the bore 13.

In the foregoing example embodiment of the present invention, an electrically conductive metal layer 11 is applied to the insulating layer 10 as a so-called protective current electrode, to which a positive charge, i.e., an opposite charge to that applied to the tube 7, is applied via a DC source 14, in order in this manner to additionally prevent the partial etching or undesired widening of the wall of the bore 13 in the workpiece 5. Alternatively, a different electrically conductive layer 11, such as, for example, a graphite layer, may also be applied as protective current electrode. The opposite, negative charge is applied to the workpiece 5 by the DC source 14.

The electrode 6 for electrochemical fine-boring in workpieces which is illustrated in FIGS. 2 and 3 is produced so that the material used for the electrode tube 7 is an electrically conductive metal of substantially amorphous structure, i.e., a so-called metallic glass material, such as, for example, a ZrTiNiCuBe alloy, and the electrode tube 6 is drawn from a semi-finished tube of larger external diameter to an external diameter D in the range from 0.2 mm to 0.04 mm by glass drawing in an inert gas atmosphere. Then, an insulating layer 10 is applied to the outer surface of the electrode tube 6 produced in this manner, so that during the fine-boring of a bore 13 into a workpiece 5, there is passage of current only in the region of the opening 9 of the electrode tube 6, due to the electrolyte 4 emerging at that location. The insulating layer 10 substantially is formed of AlON, TiAlON or an oxide ceramic. In the case of the electrode 6 illustrated in FIG. 3, an electrically conductive metal or graphite layer 11 is then also applied to the insulating layer 10, for example, by sputtering or vapor deposition, this layer serving as a protective current electrode.

What is claimed is:

1. An electrode for electrochemical fine-boring of a workpiece, comprising:
   an electrode tube configured to pass through to a hole at a tip of the electrode tube an electrolyte to reach the workpiece; and
   an electric conductor connected to the electrolyte;
   wherein the electrode tube is formed of a metal having a substantially amorphous structure, is electrically conductive and includes on its outer surface a nonconductive insulating layer for preventing electrochemical erosion at all but the tip of the electrode.

2. The electrode according to claim 1, wherein an external diameter of the electrode tube is between 0.2 mm and 0.04 mm.

3. The electrode according to claim 1, wherein the electrode tube includes at least one of a circular and a non-circular cross-sectional geometry.

4. The electrode according to claim 1, wherein the insulating layer is substantially formed of one of AlON, TiAlON, an organic base, an organic coating and an inorganic oxide ceramic.

5. The electrode according to claim 1, wherein the outer surface of the electrode tube is substantially completely provided with the insulating layer.

6. An electrode for electrochemical fine-boring of a workpiece, comprising:
   an electrode tube formed of a ZrTiNiCuBe alloy and configured to pass through an electrolyte to reach the workpiece; and
   an electric conductor connected to the electrolyte;
   wherein the electrode tube is formed of a metal having a substantially amorphous structure, is electrically conductive and includes on its outer surface, at least in sections, a nonconductive insulating layer.

7. An electrode for electrochemical fine-boring of a workpiece, comprising:

an electrode tube configured to pass through an electrolyte to reach the workpiece; and an electric conductor connected to the electrolyte;

wherein the electrode tube is formed of a metal having a substantially amorphous structure, is electrically conductive and includes on its outer surface; at least in sections, a nonconductive insulating layer; and wherein a thickness of the insulating layer is between 4 $\mu$m and 10 $\mu$m.

8. An electrode for electrochemical fine-boring of a workpiece, comprising:

an electrode tube configured to pass through an electrolyte to reach the workpiece; and an electric conductor connected to the electrolyte;

wherein the electrode tube is formed of a metal having a substantially amorphous structure, is electrically conductive and includes on its outer surface, at least in sections, a nonconductive insulating layer; and one of an electrically conductive metal and a graphite layer applied at least to sections of the insulating layer.

9. A method for producing an electrode for electrochemical fine-boring, the electrode including an electrode tube configured to pass through an electrolyte to reach a workpiece and an electrical conductor connected to the electrolyte, the method comprising the steps of:

providing an electrically conductive metal having a substantially amorphous structure as a material for the electrode tube;

drawing the electrode tube from a tube of a larger external diameter to a smaller external diameter by glass drawing; and applying a nonconductive insulating layer at least to an outer surface of the electrode tube.

10. The method according to claim 9, wherein the drawing step is performed in an inert gas atmosphere.

11. The method according to claim 9, wherein the drawing step includes the substep of drawing the tube of the larger external diameter to an external diameter of the electrode tube between 0.2 mm to 0.04 mm.

12. The method according to claim 9, further comprising the step of applying one of an electrically conductive metal and a graphite layer at least to sections of the insulating layer.

* * * * *